2,997,432
DYEING OF 1-OLEFIN POLYMERS
Robert A. Koble and Walter A. Goldtrap, Bartlesville, Okla., assignors to Phillips Petroleum Company, a corporation of Delaware
No Drawing. Filed Aug. 14, 1958, Ser. No. 754,924
7 Claims. (Cl. 204—162)

This invention relates to the dyeing of polymers prepared from 1-olefins. In one aspect, this invention relates to dyeing of polymers of 1-olefins with methyl red. In another aspect, this invention relates to the prevention of dye bleeding from 1-olefin polymers. In still another aspect, this invention relates to irradiation of 1-olefin polymers dyed with methyl red.

Polymers of aliphatic mono-1-olefins, especially polyethylene, have long been used for film for wrapping food stuffs, sterilized toys, and various other articles, packages, and the like. Such polymers have also been used for preparing various objects such as sheets by extrusion, compression molding, laminations, and the like, as well as the formation of other useful objects by injection molding, vacuum forming and similar well known molding techniques.

Methyl red (para-dimethylaminoazobenzene-carboxylic acid) imparts a pleasing color to various fabrics, plastics, and the like. However, methyl red has not herebefore been successfully used with polymers of 1-olefins since this dye has a tendency to bleed even in very small amounts, e.g., 0.1 percent and even less. Other organic dyes, especially those having

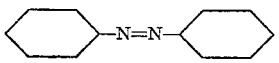

structure tend to bleed at higher concentrations.

It is an object of this invention to provide a means for dyeing polymers of aliphatic 1-olefins with methyl red.

Another object of this invention is to provide a means of preventing bleeding of dyes from polymers of 1-olefins when incorporated in amounts subject to bleeding.

Other objects, features and advantages of this invention will be obvious to those skilled in the art having been given this disclosure.

According to this invention, a polymer of an aliphatic mono-1-olefin having a dye subject to bleeding incorporated therein is irradiated with a source of high energy radiation. According to one aspect of this invention, a polymer of an aliphatic mono-1-olefin is irradiated with a maximum of $5 \times 10^6$ roentgens.

It is known to irradiate polymers of 1-olefins to effect cross-linking and where the dye is incorporated in the finished article, such radiation dosages are operable in this invention. Where optimum properties of a cross-linked polymer are desired, the polymer is subjected to an irradiation of at least $1 \times 10^7$ roentgens, preferably $2.5 \times 10^7$ to $5 \times 10^7$ roentgens. However, it is frequently desired to incorporate the dye into the polymer at the source of the polymer and to ship the prepared polymer to the fabricator. In such cases, it is desirable to prevent bleeding but it is undesirable to introduce severe cross-linking since crosslinked polymer is difficult, if not virtually impossible, to work. In such a case, only mild irradiation is used. The methyl red can be stabilized against bleeding with as little as $0.5 \times 10^6$ roentgens which is preferably provided over a period of at least four hours. However, the time element is not critical, the stability being obtained by total dosage. Where the polymer is to be worked or formed subsequent to the irradiation step or where crosslinking is not desired, the radiation is preferably in the range $1 \times 10^6$ to $5 \times 10^6$ roentgens over a period of 4 to 12 hours.

The method of this invention is applicable to normally solid polymers prepared from mono-1-olefins, preferably such 1-olefins of 2 to 8 carbon atoms and having no branching nearer the double bond than the 4-position, and even more preferably the polymer is polyethylene or a copolymer of at least 50 weight percent of ethylene with one or more such olefins. These latter copolymers, as well as polyethylene, will be referred to herein as ethylene polymers. Examples of the preferred 1-olefins include ethylene, propylene, butene-1, pentene-1, hexene-1, octene-1, 4-methylpentene-1, 4-methylhexene-1, 5-methylheptene-1, 6-methylhexene-1, 4-ethylhexene-1, 4,5-dimethylhexene-1, and the like. These olefins can be polymerized alone, with each other or with other olefins such as butene-2, pentene-2, isobutylene, and the like; however, the preferred 1-olefin should constitute at least 50 weight percent of the monomer being polymerized.

These polymers can be prepared by any method known to the art, e.g., emulsion polymerization, solution polymerization, gas phase polymerization, liquid phase polymerization, and the like. The preferred 1-olefin polymers can be prepared by any known method, such as the older well known high pressure polymerization of such 1-olefins as ethylene, as is disclosed by Fawcett et al. in U.S. Patent 2,153,533. Preferably, the 1-olefin polymer will be one produced by one of the newer low pressure catalytic methods as is described in U.S. Patent 2,825,721 by Hogan et al.

In a method described in the copending application of Leatherman and Detter, Serial No. 590,567, filed June 11, 1956, the polymerization of such olefins is carried out with the Hogan et al. catalyst in a diluent such as pentane at a temperature below the solution temperature thereby forming polymers as discrete particles. Polymers produced by such processes will ordinarily have a molecular weight in the range 35,000 to 200,000 or even higher, a density in the range 0.95 to 0.97, e.g., approximately 0.96, and a crystallinity in the range 90 to 95 percent at ambient temperatures as determined by nuclear magnetic resonance. The polymer ordinarily has a crystalline freeze point in the range 245 to 265° F. and a softening point of about 260° F. or higher. The difference between crystalline freeze point and softening point is due to the difference in method by which these values are obtained as is known by those skilled in the polymer art. Polymers produced by this process have unsaturation which is preponderantly of the terminal vinyl and/or trans-internal structure. So-called "branched vinyl" unsaturation is substantially absent. These terms are more fully discussed in the cited Hogan et al. patent.

Another suitable, but less preferred and non-equivalent, method of preparing highly crystalline polymers is by polymerizing such olefins by contacting with catalyst such as a mixture of a compound represented by the formula $AlR_3$ wherein R is a saturated aliphatic, cycloaliphatic or aromatic hydrocarbon radical or hydrogen and a second component which is ordinarily a halogen compound of a metal such as titanium, zirconium, chromium or molybdenum. Another suitable catalyst comprises a mixture of a compound represented by the formula $R_mAlX_n$ wherein R is a hydrocarbon as above, X is a halogen, and $m$ and $n$ are integers of at least 1 and $m+n=3$, i.e., the valence of aluminum. Along with this latter type of catalyst, metal compounds, such as titanium dioxide, tetraalkoxides of titanium, halides of titanium and tetravalent titanium salts of organic carboxylic acids can be utilized. The polymerization reaction with these catalysts is ordinarily conducted at a temperature in the range from room temperature, or even below, up to approximately 300° C. The reaction is preferably conducted with the olefin in admixture with a hydrocarbon such as isooctane, cyclohexane and toluene, which is inert and non-deleterious to the catalyst under reaction conditions. The pressure is ordinarily sufficient to maintain the inert hydrocarbon in substantially the liquid phase. The reactor effluent is ordinarily treated with a compound, such as methanol, acetone, acetic acid or water which decomposes the remaining catalyst and the polymer is recovered by vaporization of the hydrocarbon solvent or diluent or by precipitation of the polymer such as by coating. Polyethylene produced with this general type of catalyst will have molecular weights of the same order as those produced by the chromium oxide catalyst, crystallinities of 80 to 85 percent and densities of about 0.94.

Still another method of forming such polymer is to liquefy the monomer by low temperatures and high pressures and to carry out the polymerization in liquid phase.

As has been indicated, the methyl red is incorporated in the polymer, and polymer containing the dye is subjected to a source of electromagnetic irradiation such as gamma rays or other high energy irradiation. While the reason that methyl red is made color fast by high energy irradiation is not clearly understood, it is believed that this irradiation effects a crosslinking between the double bond of the dye and the polymer. However, all such dyes when incorporated in such polymers do not bleed. Two very closely related dyes, methyl orange [para-(para-dimethylaminophenylazo)-benzene sulfonate of sodium] and methyl yellow (dimethylaminoazobenzol) do not bleed even with relatively high loadings of dye, e.g., 1 percent. On the other hand, methyl red will bleed even in very low concentrations, e.g., less than 0.1 percent.

The irradiation is preferably carried out in an oxygen-free atmosphere since irradiation in the presence of oxygen frequently has an effect on the color which very probably is caused by a reaction of the dye with the oxygen which is promoted by high energy irradiation. If desired, only the polymer surface can be irradiated.

The methyl red can be incorporated into the polymer by any known method. The dye can be hot milled into the polymer by heating the polymer to a temperature above its softening temperature and incorporating the dye on a suitable blending apparatus such as a roll mill or Banbury mixer. The dye can be added to a solution of the polymer and the polymer precipitated thereby incorporating the dye. The dye can be added to a solution of polymer, the solution irradiated, and the irradiated polymer precipitated. In this case, the dye will be color fast. The dye can be dissolved in a solvent for the polymer and milled into the polymer.

*Example*

To show the effectiveness of the process of this invention, a polyethylene as prepared by the process of Hogan et al. in cyclohexane and in the presence of a chromium oxide catalyst on silica-alumina support was loaded with 0.5 weight percent methyl red on a hot roll mill, 300–310° F., until a uniform dispersion of dye was obtained. The polyethylene had a melt index of 5, a density of 0.96 and a crystallinity in excess of 95 percent at room temperature as measured by magnetic nuclear resonance.

Separate portions of the polyethylene had 0.5 weight percent methyl orange and 0.5 weight percent methyl yellow incorporated in the same manner.

After incorporating the dyes, the polymer was formed into sheets of about ⅛ inch thickness. These sheets were each cut into two portions and one portion subjected to an irradiation dosage of $2.97 \times 10^7$ roentgens of gamma irradiation over a period of 9.33 hours at the Materials Testing Reactor at Idaho Falls, Idaho. The irradiation was carried out in a helium atmosphere. The test results are given in the table below.

| Sample | Dye | Irradiated | Observation |
|---|---|---|---|
| 1a | Methyl Red | yes | no bleeding. |
| 1b | do | no | serious bleeding. |
| 2a | Methyl Orange | yes | no bleeding. |
| 2b | do | no | Do. |
| 3a | Methyl Yellow | yes | Do. |
| 3b | do | no | Do. |

From the above table, it can be seen that surprisingly only one dye showed evidence of bleeding even at these heavy loadings and that the irradiation prevented bleeding of this sample.

Those skilled in the art will see many modifications which can be made and still obtain the advantages of this invention.

We claim:

1. In the process wherein methyl red is dispersed in a normally solid polymer of an aliphatic mono-1-olefin, the improvement comprising subjecting the polymer dispersion to a total dosage in the range $0.5 \times 10^6$ to $5 \times 10^7$ roentgens of high energy, ionizing radiation.

2. The improvement of claim 1 wherein the irradiation comprises gamma rays.

3. A method of stabilizing methyl red incorporated into a normally solid polymer of an aliphatic mono-1-olefin against bleeding which comprises subjecting the polymer containing the methyl red to a source of gamma irradiation in the range $1 \times 10^6$ to $5 \times 10^6$ roentgens.

4. A method of stabilizing methyl red incorporated into a normally solid polymer of aliphatic mono-1-olefins of 4 to 8 carbon atoms and no branching nearer the double bond than the 4-position against bleeding which comprises subjecting the polymer containing the methyl red to gamma irradiation in the absence of oxygen for a total dosage in the range $0.5 \times 10^6$ to $5 \times 10^7$ roentgens given over a period in the range 4–12 hours.

5. The method of claim 4 wherein the polymer is polyethylene.

6. The method of claim 5 wherein the total dosage of gamma rays is in the range $1 \times 10^6$ to $5 \times 10^6$ roentgens.

7. The method of claim 5 wherein the total dosage of gamma rays is in the range $2.5 \times 10^7$ to $5 \times 10^7$ roentgens.

References Cited in the file of this patent

UNITED STATES PATENTS

| 2,830,943 | Mackenzie | Apr. 15, 1958 |
| 2,855,517 | Rainer et al. | Oct. 7, 1958 |
| 2,875,047 | Oster | Feb. 24, 1959 |